A. RHENSTROM.
SEMI-AUTOMATIC MACHINE FOR FORMING BED SPRING FABRICS.
APPLICATION FILED NOV. 12, 1917.
1,390,814.
Patented Sept. 13, 1921.
8 SHEETS—SHEET 1.
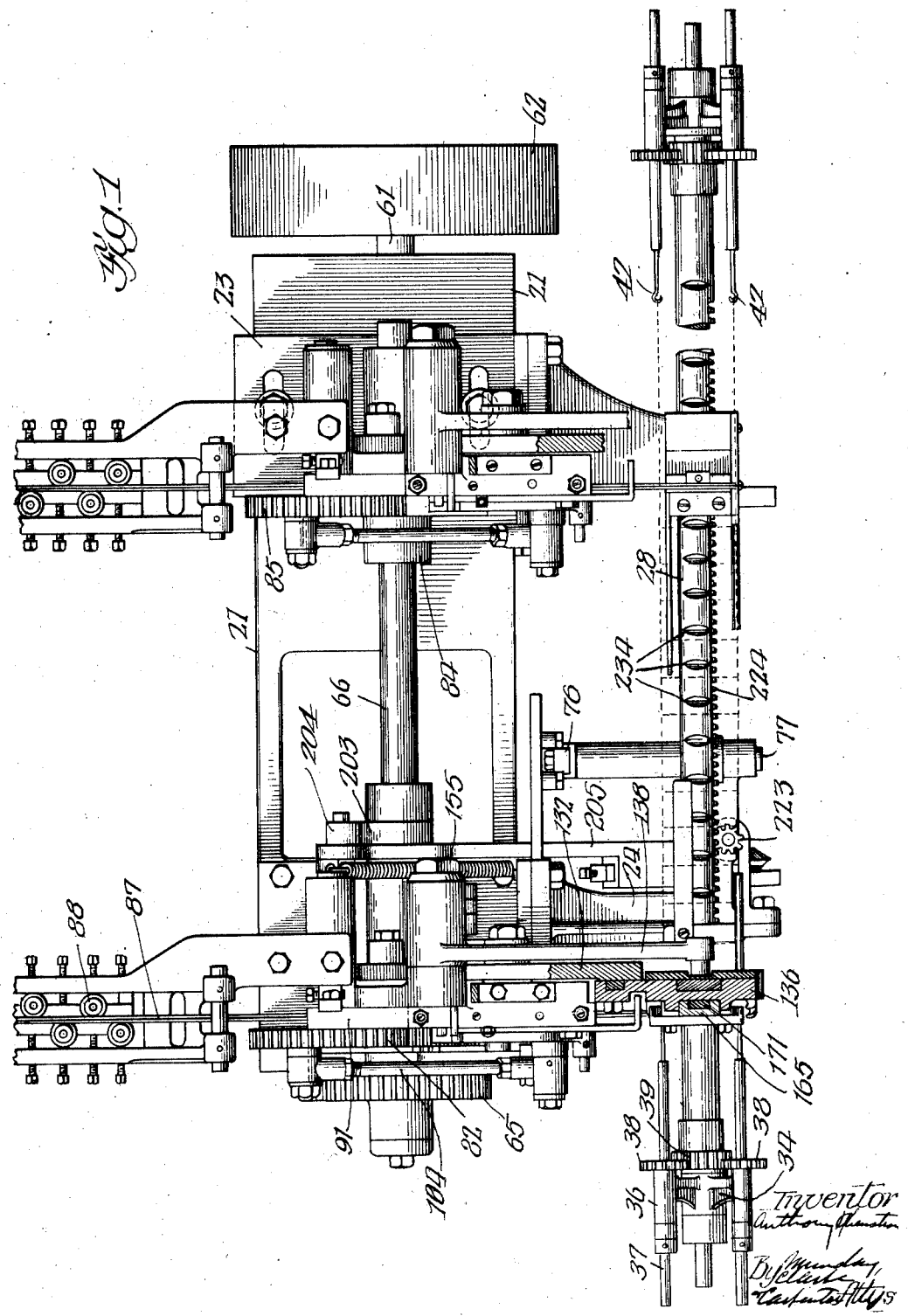

A. RHENSTROM.
SEMI-AUTOMATIC MACHINE FOR FORMING BED SPRING FABRICS.
APPLICATION FILED NOV. 12, 1917.
1,390,814.
Patented Sept. 13, 1921.
8 SHEETS—SHEET 2.
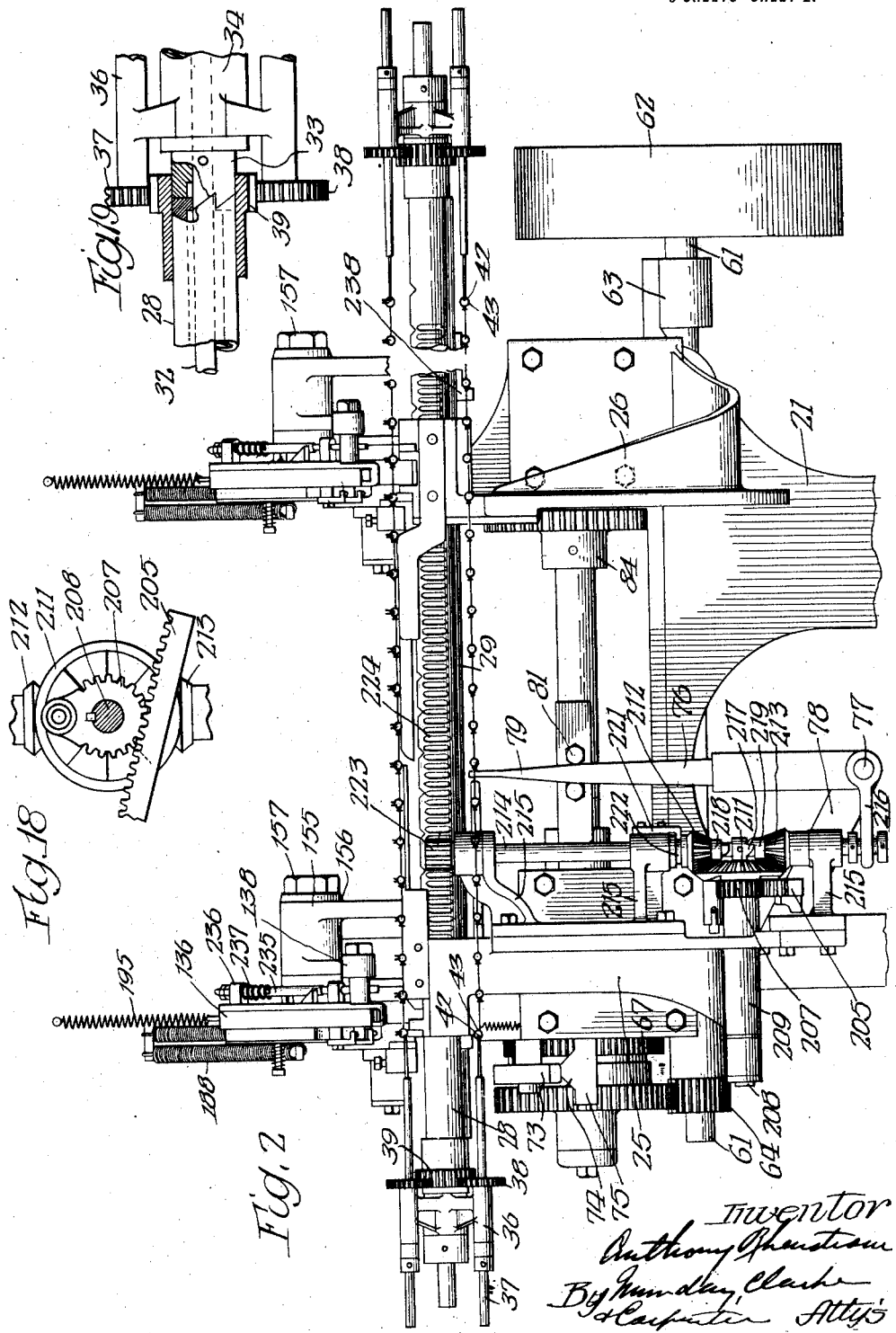

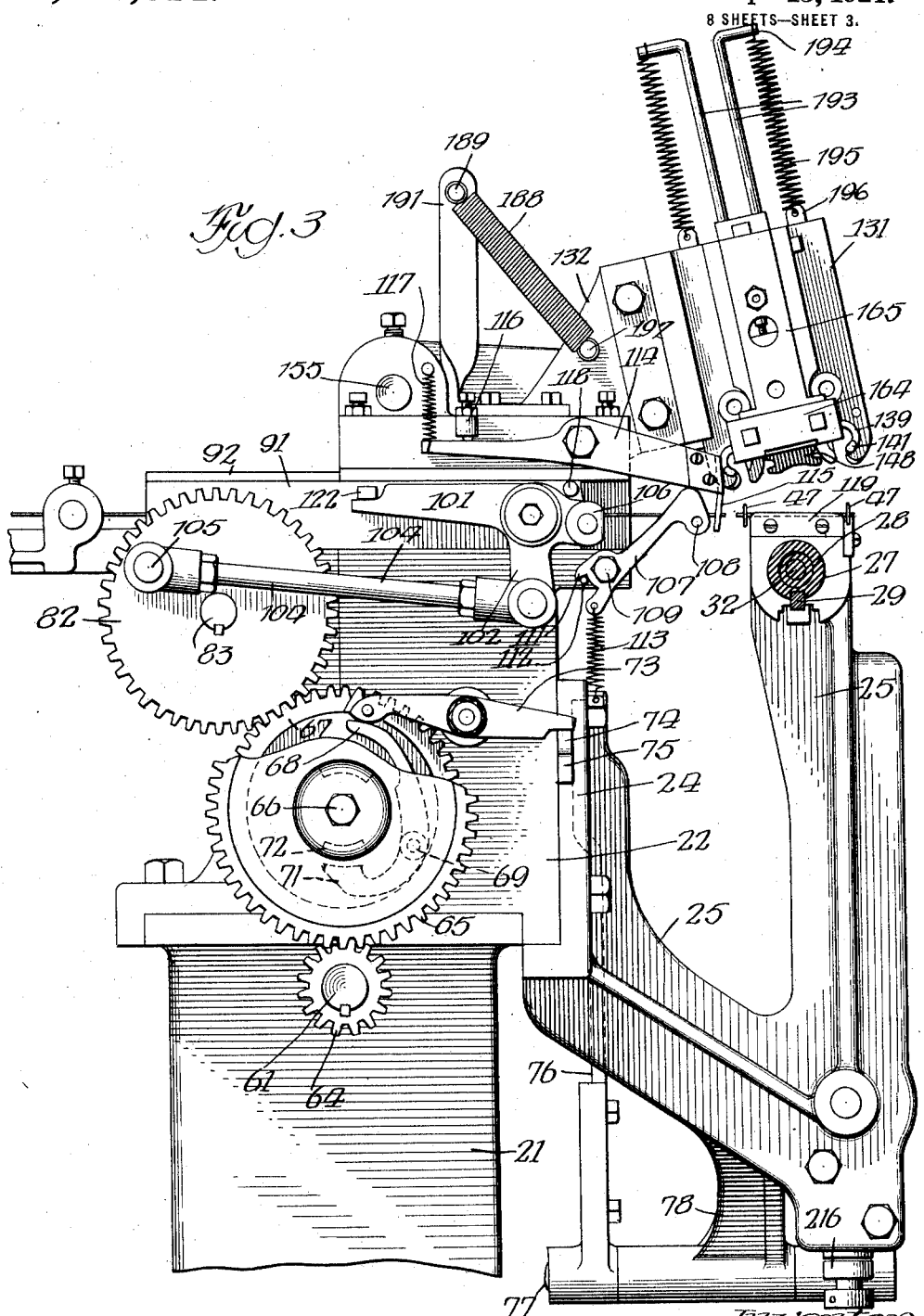

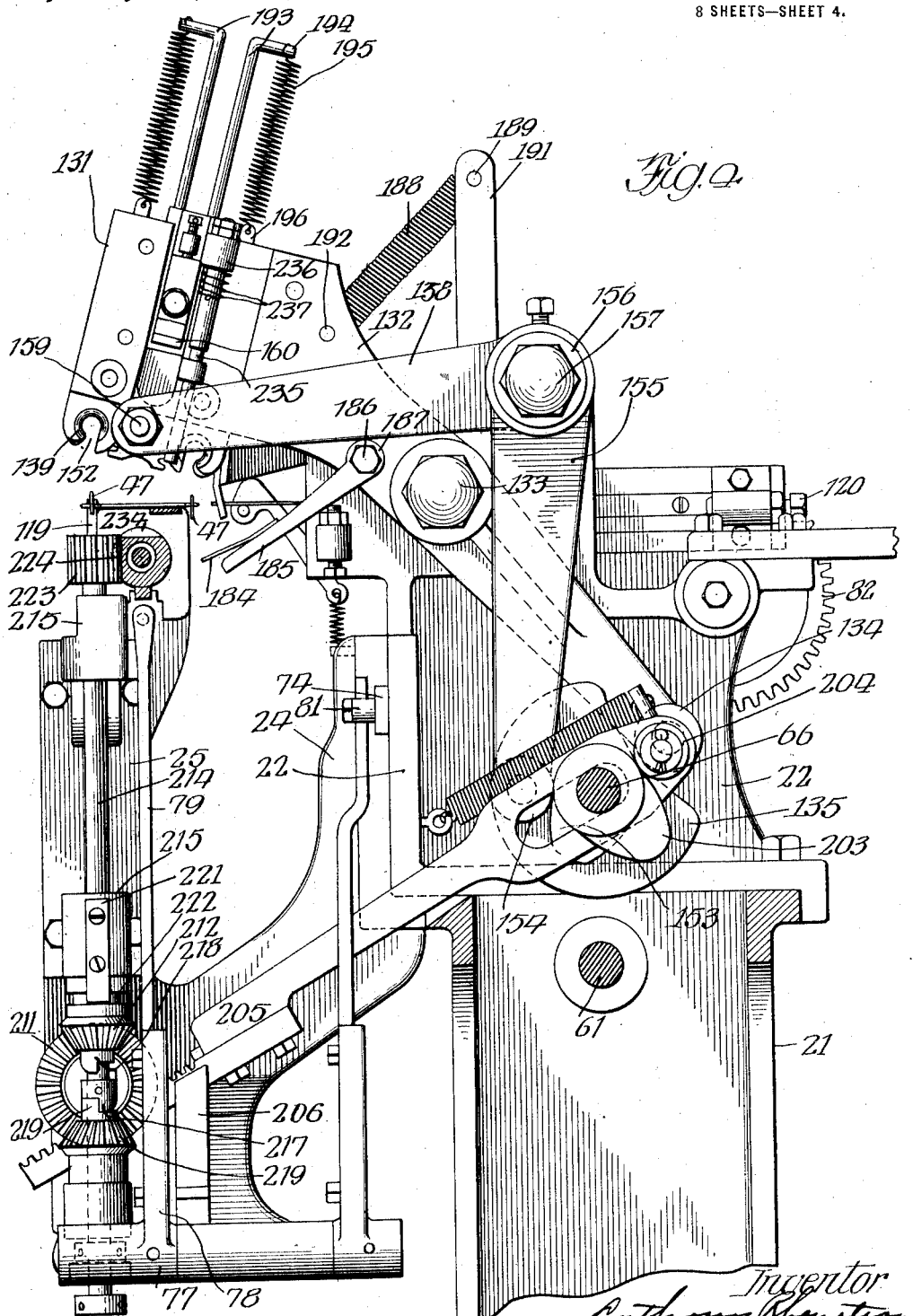

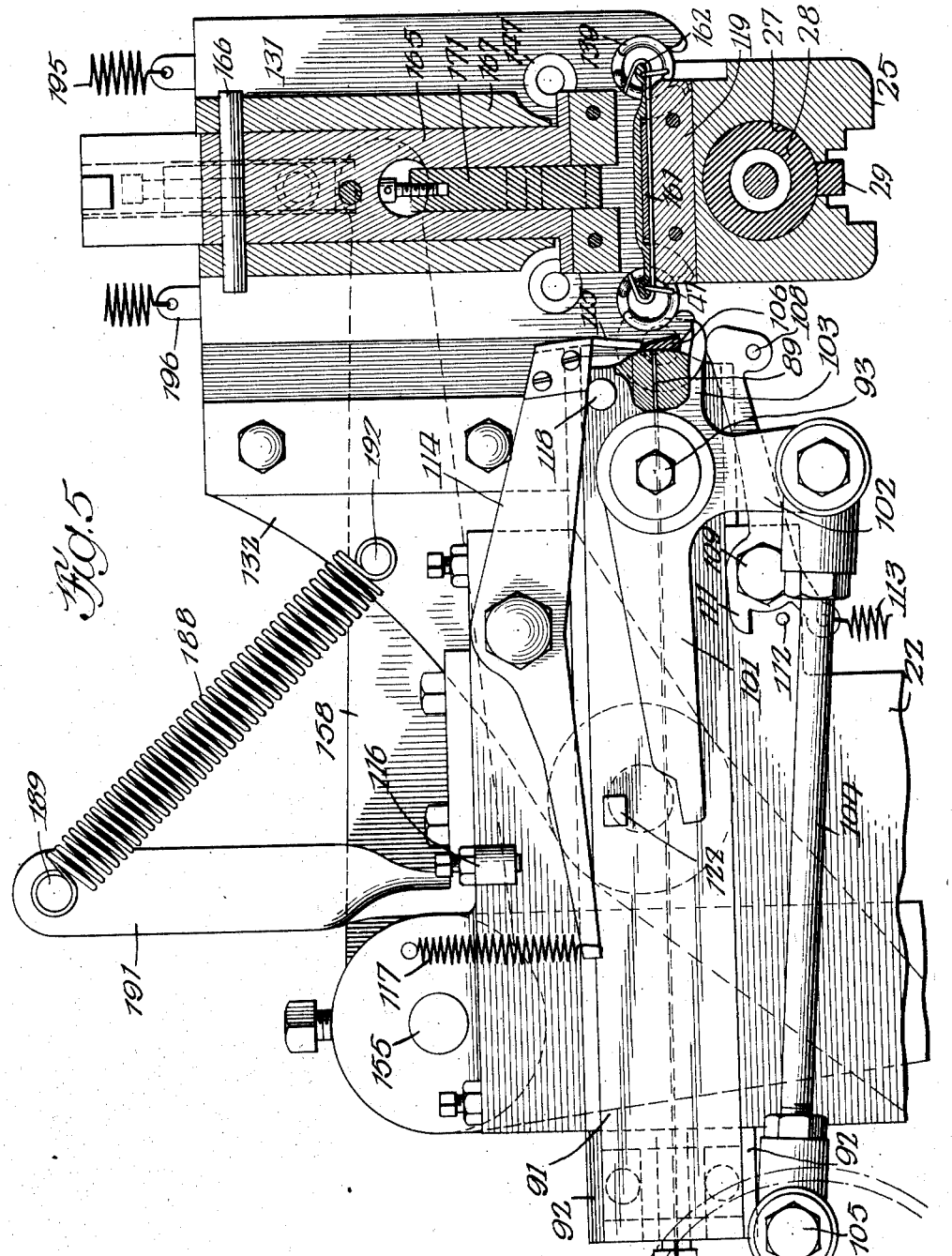

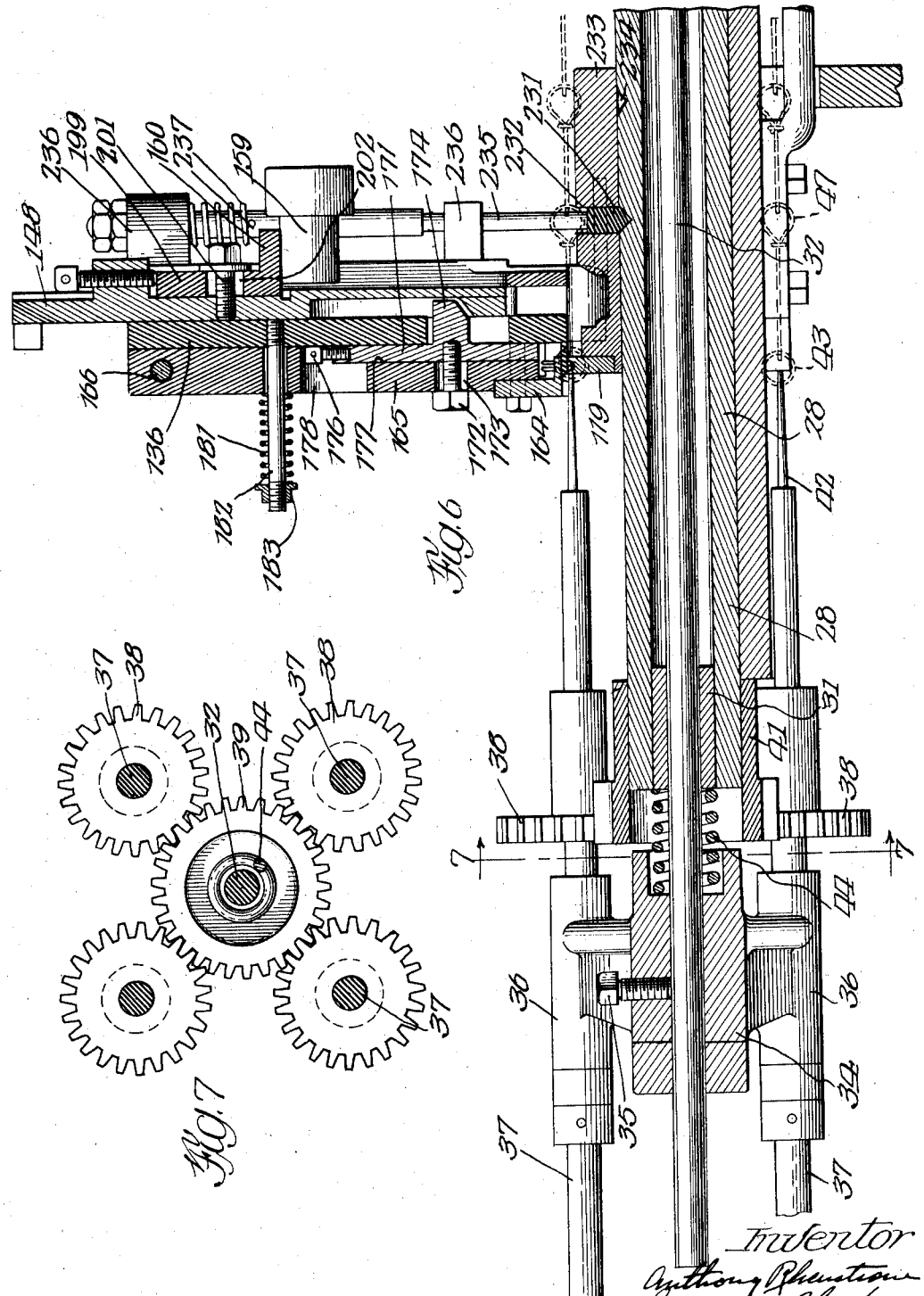

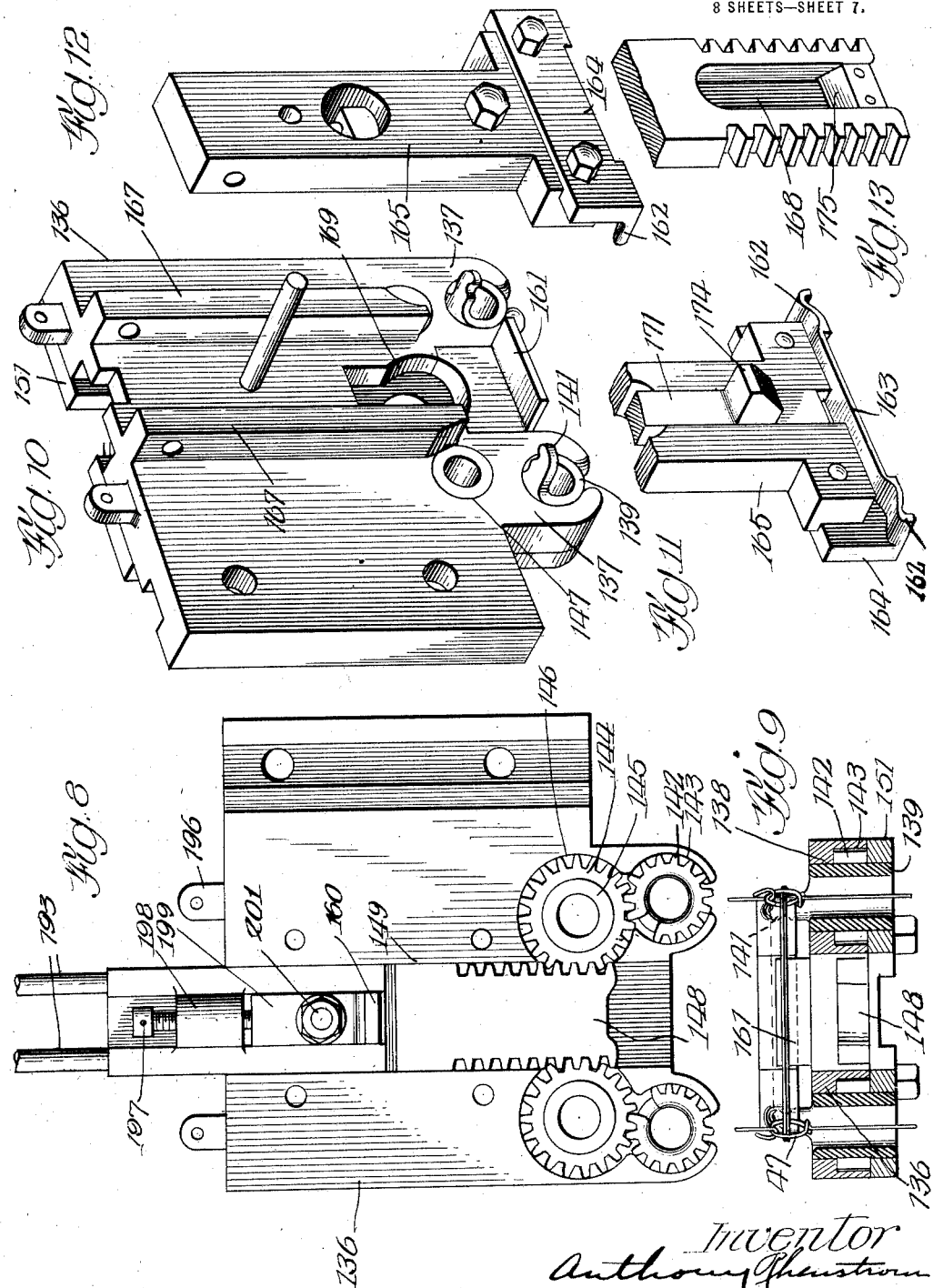

A. RHENSTROM.
SEMI-AUTOMATIC MACHINE FOR FORMING BED SPRING FABRICS.
APPLICATION FILED NOV. 12, 1917.
1,390,814.
Patented Sept. 13, 1921.
8 SHEETS—SHEET 8.
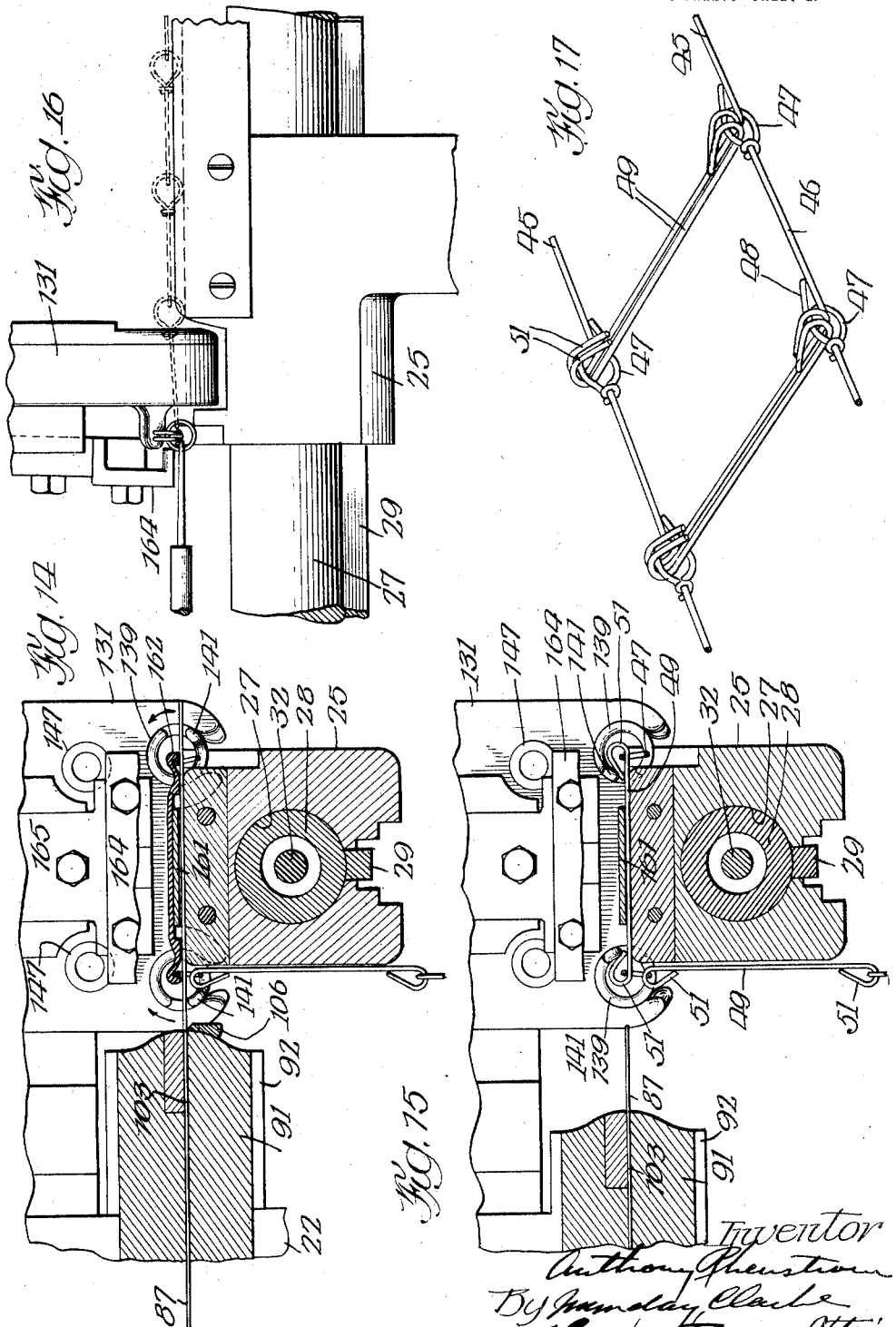

UNITED STATES PATENT OFFICE.

ANTHONY RHENSTROM, OF KENOSHA, WISCONSIN, ASSIGNOR, BY MESNE ASSIGNMENTS, OF ONE-HALF TO CHARLES O. GRAFTON, OF MUNCIE, INDIANA.

SEMI-AUTOMATIC MACHINE FOR FORMING BED-SPRING FABRICS.

1,390,814. Specification of Letters Patent. Patented Sept. 13, 1921.

Application filed November 12, 1917. Serial No. 201,436.

*To all whom it may concern:*

Be it known that I, ANTHONY RHENSTROM, a citizen of the United States, residing in Kenosha, in the county of Kenosha and State of Wisconsin, have invented a new and useful Improvement in Semi-Automatic Machines for Forming Bed-Spring Fabrics, of which the following is a specification.

This invention relates in general to machines for forming wire fabrics to be used in bed springs and the like, and has more particular reference to the provision of a machine for forming fabrics by connecting appropriate links of wire chain sections which extend from one edge of the fabric to the opposite edge.

A principal object of this invention is the provision of a machine adapted to accomplish this and of a simple, semi-automatic character.

Another object of the invention is the provision of a machine of the character described, which will permit the wire strands to be used in forming the cross connecting links to be threaded through the links of the cross chains to be connected and from such position formed into a link of the desired character, thereby providing for a minimum movement of the wire in the machine and permitting the use of simple bending mechanism.

A further object of the invention is the provision of simple, efficient bending mechanism for forming the cross connecting links and acting in a positive, certain manner upon the wire being formed into such cross connecting links to produce a product of uniform grade.

A further object of the invention is the provision of a machine of the character described, in which the chain sections may be placed by hand and readily brought into the zone of operation of the wire feeding and bending devices, the apparatus being so constructed and arranged that thereafter the action is entirely automatic.

A still further object of the invention is the provision of an accurate wire feed, and accurate devices for positioning the links of the chain sections to be connected to receive the cross connecting links.

A further object of the invention is the provision of a machine provided with a progressive chain feeding device having no idle return stroke.

Numerous other objects and advantages of the invention will be apparent as it is better understood from the following description when considered in connection with the accompanying drawing illustrating a preferred embodiment thereof.

On the drawings,

Figure 1 is a top plan view of a machine embodying my present invention;

Fig. 2 is a front elevation of the same;

Fig. 3 is an end view looking from the left in Fig. 1;

Fig. 4 is a vertical transverse sectional view taken midway of the machine and looking from the right in Fig. 2;

Fig. 5 is an enlarged detail sectional view taken through a link forming mechanism;

Fig. 6 is a partial longitudinal vertical section taken through the center of the carriage for holding the chain sections;

Fig. 7 is a section taken substantially on the line 7—7 of Fig. 6;

Fig. 8 is a slightly enlarged detail view of a portion of the link forming mechanism and showing the method of actuation of the link formers;

Fig. 9 is a horizontal section through a set of link formers and showing the actual formation of the link;

Fig. 10 is a perspective view of a portion of the link forming mechanism, certain parts being removed;

Figs. 11 and 12 are perspective views of opposite sides of the swinging support for the ends of the wires as they are being formed into the link;

Fig. 13 is a partial perspective view of the bending finger actuating rack;

Figs. 14 and 15 are enlarged detail sections showing the action of the wire bending fingers;

Fig. 16 is a partial enlarged side elevation showing certain details of construction;

Fig. 17 is a perspective view of the type of fabric for which the machine shown and described as an embodiment of my present invention is particularly adapted;

Figs. 18 and 19 are enlarged partial views showing certain details of construction.

This invention contemplates the provision of a simple, semi-automatic machine in which the operation of the various instrumentalities may closely follow each other thereby giving to the machine a high rate of output, the arrangement being such that chain sections to receive the cross connecting links may be easily placed in the machine by hand and the machine operated without confusion and without the necessity of skilled attendants.

A main frame 21 provides a support for the working parts of the machine and may be of any suitable or preferred construction. Upon this main frame is bolted or otherwise secured a pair of supplementary frames 22 and 23, each carrying a link forming mechanism, the present machine being provided with two such mechanisms adapted to operate together to cross connect two pairs of links of the chain sections at each operation. Each supplementary frame comprises a forwardly and downwardly extending arm 24 upon the lower end of which bearing arms 25 and 26, extending upwardly, are provided.

These bearing arms support a longitudinally movable carriage forming a holder for the chain sections to be cross connected by the link forming mechanisms. Each bearing arm is provided with an opening 27 through which is positioned a sleeve 28, said sleeve being held against rotation or angular movement by a key 29, said sleeve, however, being free to move longitudinally of its axis through the apertures 27. Within the sleeve 28 and at each end is fixed a short collar or sleeve 31 which forms a bearing for a shaft 32. The sleeve 28 has a ratchet connection at the right hand end of the machine with a collar 33, as seen in Fig. 19 fast upon the shaft 32, the purpose of which will be hereinafter fully explained. A carriage head 34 is locked by a bolt 35, or otherwise, upon each end of the shaft and each head is provided with four outwardly extending bearing arms 36 in which are mounted rotatable shafts or rods 37. Each of these shafts or rods carries a pinion 38 meshing with a similar pinion 39 rigidly fast upon the end of the sleeve 28 at 41. The rods 37 carry at their inner ends hooks 42 adapted to be engaged by the end eyes 43 of the chain sections, these sections being merely hooked in place by the operator.

To start the apparatus two chain sections are positioned in the sets of hooks located at the front of the machine and the head 34 is then rotated to carry them up over and away from the attendant into the zone of the link forming mechanism. The movement of the head causes an equal rotation of the hooks 42 and thereby insures the two chain sections coming into operative position being arranged with the eyes of the links in proper position. A spring 44 is provided between the head 34 at the left hand side of the machine and the adjacent ends of the sleeve 28 and collar 31, this spring tending to pull the clutch collar 33, already described, into ratchet engagement with the right hand collar 31 thus locking the parts in the position they have assumed. It will be understood that in this movement the pinion 39 is stationary as is also the sleeve 28 and collar 31 and that throughout the operation of the machine these last mentioned parts do not turn.

The apparatus is initially arranged with the chain section carriage at one end or the other of its longitudinal stroke.

The fabric designed to be constructed by the machine forming the present embodiment of my invention, is shown in Fig. 17, from which it will be noted that the chain sections indicated by reference characters 45 consist of duplicated links 46 having an eye 47 at one end and a closed hook or eye 48 at the other, threaded through the eye 47 of the next link. The instant machine is adapted to thread a double cross connecting link 49, i. e. two cross connecting links 49 through each pair of alined eyes 47 and to provide closed hooks or eyes 51 embracing the wire material of the eyes 47.

When the carriage heads are rotated to bring the chain sections into the zone of operative mechanism, as just described, the gears are so constructed that the eyes of the two chain sections to be operated upon are arranged vertically. When the carriage is arranged at an end of travel one link forming mechanism is adapted to operate upon the eyes at the corresponding ends of two chain sections and the other link forming mechanism to provide cross connecting links for the eyes of a pair of links of the chain sections located midway of the ends. After these two pairs of links have been cross connected, the carriage moves as will be later described to present the eyes of the next adjacent links to receive their cross connecting link and so on until the carriage has moved its full stroke, which is half the length of the fabric and the fabric is completed.

All of the operations of this machine or apparatus except the placing of the chain sections in the carriage, are automatic and the parts are so timed that the operation is continuous and rapid.

A main power shaft 61 carrying a pulley 62 is mounted in bearings 63 in the main frame 21. This main power shaft carries at its left hand end a pinion 64 which meshes with a gear 65 loose upon a shaft 66. The shaft 66 is provided with a second gear 67 fast thereon and the two gears 65 and 67 are adapted to be clutch connected, as will be later described, to impart motion to the shaft 66. The clutch between the gears 65 and 67 consists of a curved arm 68 pivoted at 69 on the gear 67 and having a head 71 adapted to enter into recesses 72 in the hub of the gear 65 and pressed to operative position by a spring (not shown.) A lever 73 is mounted in the supplementary frame 22 and has one end bearing upon the lever 68 and adapted to withdraw it from clutching engagement. The other end of the lever rests upon a slide bar 75 having a projection 74 which projection has inclined faces as may be seen by viewing Fig. 2, it being apparent that when the projection 74 is under the lever 73, the clutch is out of engagement and when the slide bar has been moved either to the left or right the lever 68 is in clutching engagement. The slide bar 75 is mounted for horizontal reciprocation on the supplementary frame 22 and its movement is controlled by vertical lever 76 fast on a rock shaft 77 carried by an arm 78 from the main frame 21. The operating end 79 of the lever passes between two projections or set screws 81 in the slide bar so that movement of the lever controls the operation of the projection 74 and the consequent engagement and disengagement of the clutch between the gears 65 and 67. The clutching engagement is adapted to be effected by movement of the lever by the attendant and the clutch is automatically disengaged, as will be later herein described.

Assuming the parts to be in the position shown in Fig. 2, the lever is moved to the right by the attendant and the operations of connecting the two chain sections in the operating zone of the link forming mechanisms commence. The movement of the operating lever toward the right results in rotation of the gear 67. This gear meshes with a crank gear 82 upon a stub shaft 83 in the supplementary frame 22, and through the shaft 66 a corresponding gear 84 actuates a gear 85 upon a stub shaft on the supplementary frame 23, said stub shaft being a counterpart of stub shaft 83, and similarly mounted. The gear 82 forms a part of one feeding and link forming mechanism and the gear 85 a part of the other. The two feeding and link forming mechanisms are substantial duplicates of each other and a description of one of them will suffice for the other, and only the feed and link forming mechanism located at the left of the apparatus will be described in detail.

Viewing Fig. 1, it will be noted that two wires 87 are disposed through guide rolls 88 from any suitable reels (not shown). These two wires, are drawn progressively into the machine as the cross connecting links are formed. The two wires, after leaving the rolls 88, pass through a slot 89 extending through a slide 91 having edges 92 movable in suitable ways provided in the supplementary frame 22. The slide 91 is provided with an outwardly extending stub shaft 93 on which is pivotally mounted a lever having three arms, numbered respectively 101, 102 and 103. The arm 102 is connected by a connecting rod or pitman 104 with a crank pin 105 of the crank gear 82 so that rotation of the crank gear 82 imparts a reciprocation to the slide 91. It is intended that the slide 91 may move back along the wire, i. e. toward the left, viewing Fig. 5, to cause an appropriate length of wire to extend in front of the slide and to thereafter move to the right, viewing this figure, advancing the wire a distance equal to the length of the material desired for a double link. To this end the arm 103 carries a combined gripper and cutter 106 which, as the slide is moved to the right, is pressed up from beneath against the wire. This gripper is relatively sharp and is used after the slide 91 has reached the right hand end of its stroke to cut the wire.

Assuming the parts to be in the position shown in Fig. 3, it will be noted that the slide is retracted and that the wire extends out therebeyond. The slot through which the wire extends registers with the positioned eyes of the links to be cross connected and in order that the wire may not bend, guiding devices are provided to cause the insertion of the wire through the adjacent eye of the chain section link as the slide moves to the right, viewing this figure. These guiding devices comprise a lower lever 107 carrying a pin 108 and pivoted at 109 on the frame 22, which lever holds the end of the protruding wire at an appropriate height. This lever is provided with a lug 111 held against the stop 112 by a spring 113 when the lever is in the upper operative position shown. The guiding devices also comprise an upper lever 114 having a bifurcated end 115 which moves down over the wire to prevent lateral displacement, the lever being held against a stop 116 by a spring 117. As the slide moves forward the wire is pushed through the two adjacent eyes 47 and during this action the levers 107 and 114 are retracted, the one 107 being moved downwardly by engagement with the cutter and the lever 114 being moved up by engagement with a pin 118 mounted on the slide. Continued movement of the slide carries the wire on to and through the more remote eye 47, the end of the wire being guided in this movement by a guide plate 119 positioned on the bearing at the top of the arm 25 and by the lower part of the bending mechanism, to be later described. When the wire is in proper position through the eyes 47, it is severed by the cutter 106. This is accomplished by stopping the forward movement of the slide, the continued movement of the crank gear causing a rotation of the three armed lever to which the connecting rod 104 is connected. The slide is stopped by an adjustable set screw 121 set in the back of the slide and coming up against the rear part of the supplementary frame 22. After the crank pin 105 on the crank gear 82 has passed its center in the continued movement of the gear, the connecting rod is pulled in the opposite direction and the three-armed lever swung to withdraw the cutter from across the slide and until this arm 101 engages a stop 122 on the slide whereupon continued movement of the gear moves the slide back over the wire to cause the projection of a new length in front of it and the feeding cycle is repeated.

As soon as the wire is cut off, a swinging head generally indicated at 131 and carrying the operative parts of the wire bending portion of the link forming mechanism operates to form the link. This head is adapted to bend up the two ends of the portions or sections of wire positioned through the eyes 47 bringing these ends over and down upon the wire to form closed hooks or eyes so that the entire link is formed after the straight wire sections are in place and by a single continuous movement. The head 131 is carried upon one end 132 of a heavy lever pivoted at 133 in the supplementary frame 22. The other end of this lever is provided with a roller 134 which engages a cam 135 on the shaft 66. Rotation of the shaft from the position shown in Fig. 4 causes the lever to swing in a counter-clockwise direction moving the head down to operative position. This downward movement occurs just before the wire is fed into the eyes 47, the bottom of the head helping to guide the ends of the wire from the one eye 47 to and through the other.

The details of construction of the head are best shown in Figs. 8 to 13, from which it will be noted that the head consists of a main plate 136 having a pair of downwardly extending arms or projections 137. In each arm 137 of the main plate 136 is provided an opening 138 through which extends a sleeve 139 carrying a wire bending finger 141. Each sleeve 139 is embraced by a pinion 142 mounted in an enlarged portion 143 of the opening through the downward projections 137 of the main plate. Each pinion 142 meshes with a pinion 144 carried on sleeves 145, said pinions being set in recesses 146 of the main plate with the sleeves extending into a bearing 147 therein. The two pinions 144 engage opposite sides of a rack 148 mounted to slide vertically in a slot 149 in the main plate, movement of the rack 148 imparting an angular eccentric movement to the fingers 141. A plate 151 is secured upon the main plate and closes the slot 149 and the enlarged openings 143 and 146, this plate having appropriate openings to receive the sleeves 139 and 145 to provide bearings therefor. Each sleeve 139 is cut away at 152 so that it may be moved down over and embrace the chain sections to be connected.

In action the fingers 141 move around about the axes of the sleeves and bend the ends of wire.

Referring again to Fig. 4, it will be noted that the shaft 66 also carries a cam 153 engaging a roller 154 upon the end of one arm 155 of a bell crank lever 156, pivoted at 157 on the frame 22. The other arm 158 of this bell crank lever is provided with the stud 159 adapted to engage and lift an outstanding projection 160 on the rack. After the head has swung down bringing the chain sections into the sleeves 139, the fingers 141 are positioned beneath the path of movement to the wire being fed into the chain section, one finger being located beneath each end of the double wire link blank provided by the feeding and cutting mechanism. These fingers thereafter move out and up under the extreme ends of the sections or link blanks of wire disposed through the eyes 47 bending the ends up and through continued movement over into closed hooks or eyes, this movement of the sleeves being accomplished by the upward movement of the rack 148 and through the consequent movement of the pinions 144. In order that the closed hooks or eyes may be accurately formed, dies or supports are provided for the bent portions of the wire and means also provided for holding the ends of the strands being bent firmly against the guide 119. A lip or flange 161 extends out from the lower edge of the plate 136 in position to guide the wire sections. The bending dies or supports are formed at 162 on the ends of a flange 163 which in the downward movement of the head rests upon and forms extensions of the flange 161. The flange 163 is carried on a plate 164 secured to an arm 165 pivoted at 166 between outstanding flanges 167 of the plate 136 (compare Figs. 6, 10 and 12). The arm 165 is in the true vertical position shown during the initial part of the movement of forming the eyes in the cross connecting links and this arm is swung outwardly (to the left viewing Fig. 6) just before completion of the movement of the bending fingers in order that the eyes may be closed, as may be seen by viewing Fig. 15. This outward movement of the arm 165 is accomplished through continued upward movement of the rack 148 and to this end a recess 168 is formed in the adjacent face of the rack and a registering opening 169 through the plate 136. The arm carries an adjustable slide 171, held in place by a bolt 172, taking into a slotted opening 173 in the arm and into the slide 171. The slide 171 carries a beveled lug 174 which is disposed through the opening 169 and into the recess 168, this recess having a beveled lower defining surface 175 adapted to engage the beveled surface of lug 174 at the proper instant and swing the arm 165 outwardly to withdraw the flange 163. The bolt and slot connection 172, 173 and also a set nut or bolt 176 are provided to permit proper adjustment of the parts so that this outward movement may occur accurately at the proper instant, the bolt 176 taking against the upper end of the recess 177 in the arm 165 and an opening 178 being provided through the arm to permit access to the bolt.

The arm 165 is normally held in operative position by a spring 181 disposed about a pin 182 extending out from the plate 136 and bearing against a nut 183 on the end of the pin at one end and at the other upon the outer face of the arm 165.

When the head moves down, the eye 47 at the front side of the apparatus is held in place by the guide 119 and the eye at the other side is slightly lifted by a spring 184 on the end of an arm 185 pivoted at 186 upon the arm 132 of the lever carrying the swinging head. An adjustable stop 187 is provided to engage under the arm 185 so that its free end is swung upwardly positively positioning the rear eye 47 in the sleeve 139.

After each bending operation, the head is moved back to its normal, elevated position by a spring 188 secured at one end at 189 on an upwardly extending arm 191 from the frame 22 and at the other at 192 on the head. At the same time the parts return to their normal position. The rack 148 is provided at its top with a pair of upstanding bent rods 193, the ends 194 of which are connected by springs 195 with lugs 196 on the top of the head so that the springs 195 cause the rack to be pushed down as the cam 153 moves away from the lever 156, these springs causing the slide to move down and the lever to return to inoperative position. Means are provided for adjusting and accurately timing the action of the slide and rack bar 148, which means comprise a set screw 197 disposed through a lug 198 in the slide and acting upon a block 199 from which extends the projection 160, already referred to. A second set screw 201 is provided through a slot 202 in the block and helps hold the parts in the adjusted relation.

After each cross link is formed, the chain section holding carriage is advanced the length of a link in said chain section. This is accomplished in the first instance by a cam 203 upon the shaft 66, which cam engages a roller 204 mounted upon the end of a reciprocating rack bar 205 embracing the shaft 66 at one end and sliding in a guide 206 at the other. This rack is in continuous mesh with a pinion 207 fixed upon a shaft 208 having a bearing at 209 in the arm 25.

The shaft 208 carries also a beveled gear 211 adapted to mesh with a beveled gear 212 and with a beveled gear 213, both loose upon a shaft 214 having bearings in arms 215 on the upright arm 25.

The rock shaft 77, already described, carries an arm 216 adapted to move the shaft 214 longitudinally to cause an engagement of a clutching element 217 fast on the shaft 214 with companion clutch members 218 and 219 attached to the beveled gears 212 and 213, respectively. The beveled gear 212 is supported by a finger 221 fast on the bearing arm 215 and taking into a groove 222 in the gear hub and the gear 213 rests merely upon the lower bearing arm 215. At the top the shaft 214 is provided with a rack pinion 223 in mesh with an elongated rack 224 upon the side of the sleeve 28. After the link forming mechanism has formed a connecting link between the chain sections, the cam 203 causes an actuation of the rack bar 205 and through the gear 212 or 213, which is in mesh at the time with the gear 211, causes an advance of the carriage a distance equal to the length of a link in a chain section. The clutch 217 is adapted to determine the direction of motion of the carriage, that is to say, when the lever has been moved toward the right, viewing Fig. 2, as already described, the clutching element 217 brings into engagement the gear 212 and the actuation of the carriage is toward the left. This clutching element maintains the gear 212 actively driven until the two link forming mechanisms have entirely connected the corresponding pairs of links of the chain sections in the operative zone of the apparatus.

After each advance of the carriage, means are provided for accurately alining the presented eyes of the chain sections to receive the wire from the feeding devices. These means comprise a tapered plunger or block 231 mounted in an aperture or perforation 232 of a head block 233 at the top of the arm 25. The top of the sleeve 28 is provided with a plurality of appropriately positioned V-shaped recesses or grooves 234 in which the tapered end of the block 231 may seat. This block is pushed downwardly against the sleeve 28 by a rod 235, having bearings at 236 on the swinging head, a spring 237 being provided to push the rod 235 down upon the block. The action of the rack and pinion advancing the carriage is nearly accurate or at least sufficiently accurate to position a slot 234 beneath the block. When the head descends, the V end of the block enters the recess 234 and if the carriage is slightly out of position it is drawn to accurate relation by the wedging action of the block in the recess.

When the carriage has reached the end of its movement in either direction, stops 238 are provided to be engaged by the handle 79 of the lever 76 to bring the lever to vertical position with the projection 74 of the slide bar 75 under the end of the lever 73 to halt the action of the machine, as already described. When the stop engages the handle 79 of the lever 76, the lever is moved to the position shown in Fig. 2 and the power withdrawn from the operative parts. The operator then turns the heads 34 of the carriage through 90° bringing the chain section at the front of the machine into the position of the chain section formerly at the back of the machine and bringing also the new chain section into position at the front, the ratchet teeth between the collar 33 and the right hand collar 31 providing an accurate registration of the parts. The lever 79 is then moved toward the left carrying the projection 74 from beneath the lever 73 and establishing engagement between beveled gears 211 and 213 and the next series of cross connecting links are engaged between the chain sections, the chain section carrying carriage being a step-by-step or intermittent motion in the opposite direction. The apparatus has therefore no idle strokes and completes one series of cross connecting links while moving in one direction and the next series in returning. The operator has ample time to connect a chain section between the lowermost front hooks 42 while the feeding and link forming mechanisms are providing a series of cross connecting links between the chain sections just ahead.

The ratchet connection between the right hand end of sleeve 28 and the collar 33 is for a purpose in addition to the purpose already described,—the facilitation of the turning of the carriage without damage to the end cross-connecting links, i. e. the two cross connecting links last formed by the two bending mechanisms. It is intended that the rotation of the chain section holder shall occur immediately after the last cross-connecting link is formed and without requiring a longitudinal movement of the holder carriage. The ratchet teeth pull the end chains slightly away from the plates 119 and prevent them binding when the holder rotates under such conditions.

The chain sections are automatically disconnected when they are to leave the holder. This occurs when the hooks holding the section start to move forwardly in the rotation of the chain section holder. At this time the hooks have been rotated to present their openings outwardly and the combined pull of the formed fabric on one side of said chain section and the links connecting with the next successive chain section positioned in the holder cause the end eyes of the chain section to be pulled from the hooks. When the chain section at the edge of a fabric arrives at this point in the operation it is intended to disconnect it by hand.

As the fabric is completed it drops down between the downwardly and outwardly extending arms 24 and the upright extending arms 25, from which it may be removed after completion.

It is thought that the invention and many of its attendant advantages will be understood from the foregoing without further description.

It is believed that the invention and many of its attendant advantages will be understood from the foregoing without further description, and it will be manifest that various changes may be made in the form construction and arrangement of the several parts without departing from the spirit and scope of the invention, and without sacrificing all of its material advantages, the form hereinbefore described being merely a preferred embodiment thereof.

I claim:

1. In a machine for forming bed spring fabrics and the like, the combination of mechanism for holding a pair of chain sections adapted and intended to form strands of the fabric extending in one direction, means for feeding straight wire into position to connect said chain sections, and mechanism for bending said straight wire to link formation to form chains extending at right angles to said chain sections.

2. In a machine for forming bed spring fabrics and the like, the combination of mechanism for holding a pair of chain sections adapted and intended to form strands of the fabric extending in one direction, means for feeding straight wire through the links of said chains and thereafter bending said wire to link formation to form chains extending at right angles to said chain sections.

3. In a machine for forming bed spring fabrics and the like, the combination of mechanism for holding a pair of chain sections adapted and intended to form strands of the fabric extending in one direction, means for holding corresponding links of said chain with the openings through them in alinement, a wire feeding device for inserting a straight wire strand through said openings, and means for bending said strand to link formation to form chains extending at right angles to said chain sections.

4. In a machine for forming bed spring fabrics and the like, the combination of mechanism for holding a pair of chain sections adapted and intended to form strands of the fabric extending in one direction, means for feeding a wire strand through corresponding links of said chain sections, means for cutting off a desired length of said straight wire while said wire is through said links, and means for bending said cut-off portion of said wire to link formation to form chains extending at right angles to said chain sections.

5. In a machine for forming bed spring fabrics and the like, the combination of mechanism for holding a pair of chain sections adapted and intended to form strands of the fabric extending in one direction, means for feeding a wire strand through corresponding links of said chain sections, means for cutting off a desired length of said straight wire while said wire is through said links, and means for bending the ends of said cut-off portion about said links to connect the same.

6. In a machine for forming bed spring fabrics and the like, the combination of mechanism for holding a pair of chain sections adapted and intended to form strands of the fabric extending in one direction, means for feeding a wire strand through corresponding links of said chain sections, means for cutting off a desired length of said straight wire while said wire is through said links, and means for simultaneously bending the ends of said cut-off portion about said links to connect the same.

7. In a wire fabric forming machine, the combination of means for holding eyes of previously formed fabric members in registration with each other, feeding devices for feeding straight wire through said eyes, and bending devices for bending an end of said straight wire over and around the material of the eye through which said end has passed.

8. In a wire fabric forming machine, the combination of means for holding eyes of previously formed fabric members in registration with each other, feeding devices for feeding straight wire through said eye, and bending devices for bending the two ends of the straight wire over and around the material of the eye through which the straight wire has been passed.

9. In a wire fabric forming machine, the combination of means for holding eyes of previously formed fabric members in registration with each other, means for feeding wire through two eyes of said previously formed fabric members, cutters for cutting the wire fed into said eyes, from the supply of wire, and bending devices for bending the ends about the material of the eye through which the wire has been fed.

10. In a machine for making bed spring fabric and the like, the combination of means for bending the ends of a length of wire to form closed eyes, and supports disposed within said eyes during a portion of said bending operation, means for withdrawing said supports before said eyes are completed.

11. In a machine for making bed spring fabrics and the like, the combination of a pair of rotatable holders for positioning successive chain sections in position to receive spaced connecting links, a mechanism for forming connecting links between said chain sections, and associated instrumentalities for moving the chain sections longitudinally past said mechanism to permit the formation thereby of successive links.

12. In a machine for making bed spring fabrics and the like, the combination of a carriage adapted to contain a plurality of separated chain sections arranged parallelly, link forming mechanism and associated instrumentalities for moving said carriage past said link forming mechanism to provide successive links connecting a pair of adjacent chains on said carriage and said carriage being turnable to present successive chain sections to said link forming mechanism.

13. In a machine for making bedspring fabrics and the like, the combination of a carriage adapted to hold a plurality of separated chain sections, link forming mechanism, associated instrumentalities for moving said carriage past said link forming mechanism, said carriage being turnable to present successive chain sections to said link forming mechanism, and means for arranging the chain sections in link receiving positions as they arrive at link receiving stations.

14. In a machine for making bedspring fabrics and the like, the combination of a carriage adapted to hold a plurality of chain sections, link forming mechanism, associated instrumentalities for moving said carriage past said link forming mechanism, said carriage being turnable to present successive chain sections to said link forming mechanism, and means for turning the chains into link receiving positions as the carriage is turned to arrange the chains at link receiving stations.

15. In a machine for making bed spring fabrics and the like, the combination of a carriage having a periodic intermittent movement first in one direction and then in the reverse direction and having holders arranged in pairs to carry a pair of chain sections arranged parallelly, a link forming mechanism past which said carriage moves and adapted to form a link connecting the carried chain sections at each period of rest of said carriage.

16. In a machine for forming bed spring fabrics and the like, the combination of a carriage having a periodic intermittent movement, and adapted to contain a pair of chain sections arranged to receive connecting links, and a link forming mechanism adapted to form a connecting link between said chain sections at each period of rest, said link forming mechanism being provided with means for bringing the carriage into accurate relation with said mechanism after each movement thereof.

17. In a machine for making bedspring fabrics and the like, the combination of a carriage movable longitudinally by intermittent steps, and adapted to carry a plurality of chain sections to be connected by connecting links, and link forming mechanism, said carriage comprising spaced heads rigidly connected and rotatable together to present successive chain sections to the link forming mechanism.

18. In a machine for making bedspring fabrics and the like, the combination of a carriage movable longitudinally by intermittent steps and adapted to carry a plurality of chain sections to be connected by connecting links, and link forming mechanism, said carriage comprising spaced heads rigidly connected and rotatable together to present successive chain sections to the link forming mechanism, and a driving part intermediate said heads.

19. In a machine for making bedspring fabrics and the like, the combination of a carriage movable longitudinally by intermittent steps and adapted to carry a plurality of chain sections to be connected by connecting links, and link forming mechanism, said carriage comprising spaced heads rigidly connected and rotatable together to present successive chain sections to the link forming mechanism, and a part intermediate said heads coöperating with the link forming mechanism for arranging links of the chain sections in accurate link receiving position.

20. In a machine for making bed spring fabrics and the like, the combination of a carriage movable longitudinally by intermittent steps and adapted to carry a plurality of chain sections to be connected by connecting links, and link forming mechanism, said carriage comprising a stationary longitudinal part and rotatable chain engaging devices movable on said stationary part, and means for bringing said rotatable chain engaging devices into accurate relation angularly with said movable part to present said chain sections in appropriate relation with said link forming mechanism.

21. In a machine for forming bed spring fabrics and the like, the combination of a support for a pair of chain sections, a link forming mechanism comprising a vertically movable head, said head and mechanism being bodily movable away from said sections to permit advancement of said sections and movable to adjacent said chain sections and to permit the formation of a cross connecting link.

22. In a machine for forming bed spring fabrics and the like, the combination of a support for a pair of chain sections and a cross link forming mechanism including means for bending straight ends of the link to hook formation, said mechanism being bodily movable toward and from said support and the chain sections carried thereby.

23. In a machine for forming bed spring fabrics and the like, the combination of a support for a pair of chain sections, a link forming mechanism comprising a vertically movable head movable away from said sections to permit the insertion of a link through the links of said chain sections and after the link is in position movable toward said chain sections to press upon said link, means carried by said head for determining the form of said link, and bending devices for bending the ends of said link about the links through which said ends extend.

24. In a machine for forming bed spring fabrics and the like, the combination of a support for a pair of chain sections, a link forming mechanism comprising a vertically movable head movable away from said sections to permit the insertion of a link through the links of said chain sections and after the link is in position movable toward said chain sections to press upon said link, means carried by said head for determining the form of said link, and means for engaging the ends of the link beyond said chain sections for bending said ends upwardly and over the links of the chain section through which they extend to cross connect said links.

25. In a machine for forming bed spring fabrics and the like, the combination of means for supporting a pair of chain sections in cross link receiving position, and link forming mechanism, said link forming mechanism comprising a head adapted to press upon the center of a body of wire disposed through appropriate links of said chain sections and having fingers rotatable about eccentric axes for engaging the ends of said body of wire to bend them over said links.

26. In a machine for forming bed spring fabrics and the like, the combination of means for supporting a pair of chain sections in cross link receiving position, and link forming mechanism, said link forming mechanism comprising a head adapted to press upon the center of a body of wire disposed through appropriate links of said chain sections and having fingers rotatable about eccentric axes for engaging the ends of said body of wire to bend them over said links, said fingers being conjointly movable and by a common agency.

27. In a machine for forming bed spring fabrics and the like, the combination of means for supporting a pair of chain sections in cross link receiving position, and link forming mechanism, said link forming mechanism comprising a head adapted to press upon the center of a body of wire disposed through appropriate links of said chain sections and having fingers rotatable about eccentric axes for engaging the ends of said body of wire to bend them over said links, and a swinging member extending into the eyes thus being formed by said fingers and oscillatable from operative position as the fingers near the completion of their operative stroke.

28. In a machine for forming bed spring fabrics and the like, the combination of a support for a pair of chain sections and comprising means for alining links of said sections with the eyes of corresponding links of said sections in horizontal registration, and means for feeding a straight strand of wire through said eyes.

29. In a machine for forming bed spring fabrics and the like, the combination of a support for a pair of chain sections and comprising means for alining links of said sections with the eyes of corresponding links of said sections in horizontal registration, and means for feeding a continuous strand of wire through said eyes and subsequently cutting a length to be used in forming a connecting link from said strand.

30. In a machine for making bed spring fabrics and the like, the combination of a support for a pair of chain sections and means for providing wire material to be formed into links connecting said sections, said means comprising a reciprocating member through which said wire extends, and a cutter carried by said member and movable at the end of the feeding stroke of said member to sever the wire.

31. In a machine for forming bed spring fabrics and the like, the combination of a holder adapted to support a pair of chain sections and means for feeding wire to the links of said sections, said means comprising a reciprocating wire carrying member, and retractable supports and guides for holding an end of a wire carried by said member in registration with the links of the chain sections to be connected.

32. In a machine for forming bed spring fabrics and the like, the combination of a support for a pair of chain sections to be connected, a reciprocating member for feeding wire to connect said chain sections, a cutter, and means for moving said member and said cutter backward and forward in the feeding movement, said means producing an actuation of the cutter as a continuation of its feeding stroke.

33. In a link forming mechanism, the combination of means for forming the link, a cutter, and means for feeding wire to said forming mechanism, said means comprising a bell crank on which said cutter is mounted, and means for actuating said bell crank to move said feeding member in its reciprocation and at an end of said feeding movement to move said bell crank pivotally to sever the wire.

34. In a link forming mechanism, the combination of means for forming the link, a cutter, means for feeding wire to said forming mechanism, said means comprising a bell crank on which said cutter is mounted, and a crank disk and pitman connected to said bell crank for actuating said bell crank to move said feeding member in its reciprocation and at an end of said feeding movement to move said bell crank pivotally to sever the wire.

35. In a link forming mechanism, the combination of means for forming the link, means for feeding wire to said forming mechanism, said means comprising a reciprocating carriage, a combined gripper and cutter carried thereby, and means engaging said gripper and cutter to propel the carriage and for actuating said cutter through continued movement beyond the end of the movement of said carriage.

36. In a link forming mechanism, the combination of means for forming the link, means for feeding wire to said forming mechanism, said means comprising a reciprocating carriage, a combined gripper and cutter carried thereby, means engaging said gripper and cutter to propel the carriage and for actuating said cutter through continued movement beyond the end of the movement of said carriage, and means for adjusting the length of movement of said carriage.

37. In a machine for forming bedspring fabrics and the like, the combination of a carriage having a plurality of sets of receiving devices for receiving a plurality of chain sections, means for holding said devices to present chain sections in accurate position to receive cross links, cross link forming mechanism, automatically operable for connecting corresponding links of the chain section by cross links, said receiving devices being positioned accessible to and operable by an operator to permit the manual arrangement of chain sections in the machine progressively and while the machine is operating upon previously inserted sections.

38. In a machine for forming bedspring fabrics and the like, the combination of a carriage for receiving and presenting chain sections to a cross link forming mechanism, automatic means advancing the carriage to permit uninterrupted action of said cross link forming mechanism, a cross link forming mechanism automatically operable to form cross links between said chain sections, said carriage being provided with chain holders in which chain sections may be positioned by an operator and automatically discharging said sections after cross connection.

39. In a machine for forming bedspring fabrics and the like, the combination of link forming mechanism and attendant parts, chain holders for engaging chain ends and arranged in readily accessible position and away from attendant mechanism to permit insertion of chain sections in said holders.

40. In a machine for forming bedspring fabrics and the like, the combination of link forming mechanism and chain holders arranged in pairs, each pair individually receiving and holding the ends of a chain before cross connection and after cross connection automatically discharging both ends of said chain substantially simultaneously.

41. In a machine for forming bedspring fabrics and the like, the combination of link forming mechanism, chain holders in which chain sections previously formed may be manually inserted and means for bringing chain sections into accurate registration with said link forming mechanism.

42. In a machine for forming bedspring fabrics and the like, the combination of a carriage having a plurality of sets of chain section receiving and holding devices, link forming mechanism automatically operable and means for moving said receiving and holding devices from an inoperative zone in which they are exposed for manual insertion of said chain sections into the operative zone of the automatic action of the link forming mechanism.

43. In a machine for forming bedspring fabrics and the like the combination of link forming mechanism and chain holders arranged in pairs, said pairs of chain holders being progressively movable from a position permitting manual insertion of chain section while the link forming mechanism is in operation and thereafter movable into the zone of action of said link forming mechanism, and means arranging said chain sections progressively for connection to previously presented chain sections by said link forming mechanism.

Signed in the presence of two subscribing witnesses.

ANTHONY RHENSTROM.

Witnesses:
   JAMES E. TULLY,
   FRED SANDHOLM, Jr.